Dec. 17, 1940.  A. C. LINDGREN ET AL  2,224,971
GROUND WORKING IMPLEMENT
Filed Oct. 15, 1938   3 Sheets-Sheet 1
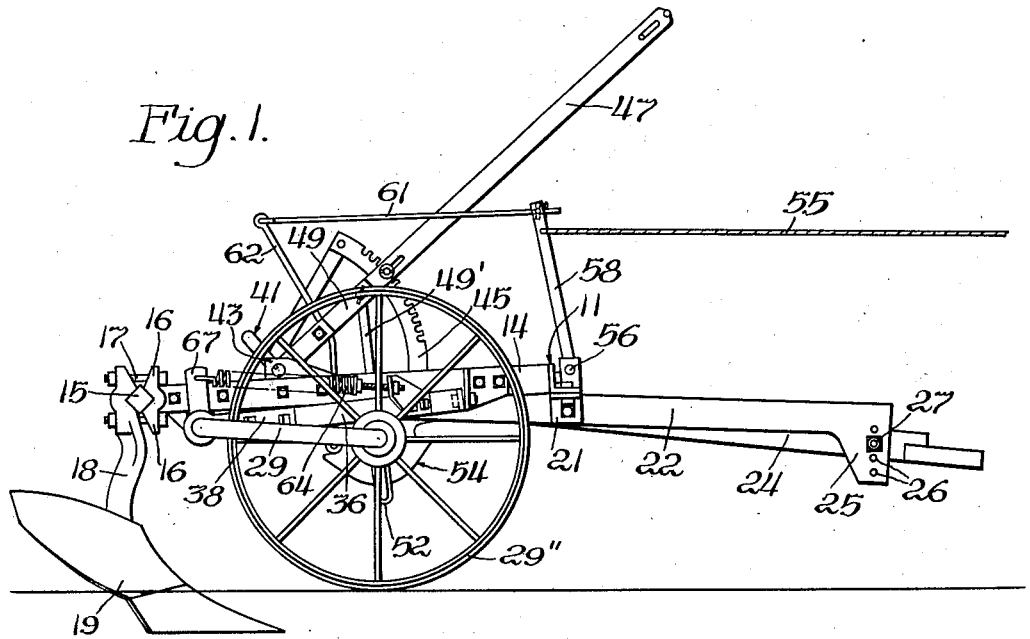
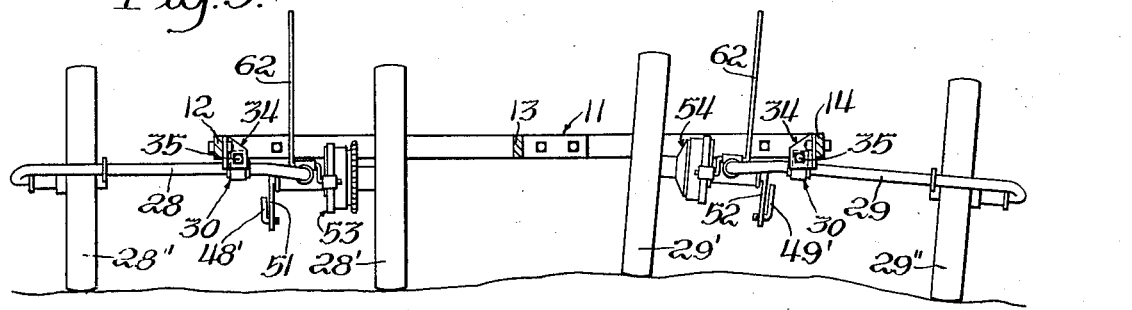
Inventors
A. C. Lindgren
A. E. W. Johnson
By V. F. Lassagne,
Att'y.

Dec. 17, 1940.     A. C. LINDGREN ET AL     2,224,971
GROUND WORKING IMPLEMENT
Filed Oct. 15, 1938     3 Sheets-Sheet 2
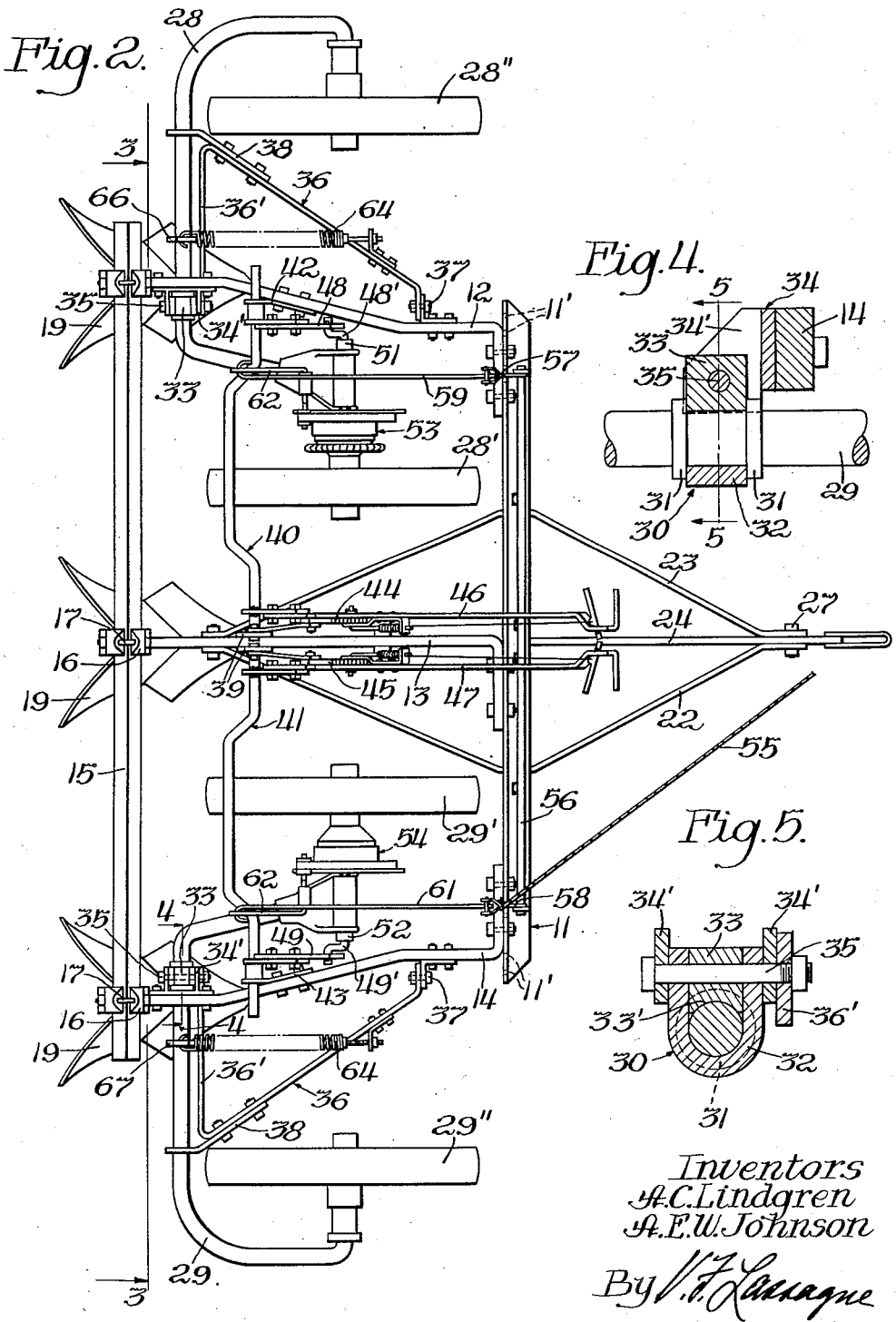
Inventors
A.C. Lindgren
A.E.W. Johnson
By [signature]
Atty.

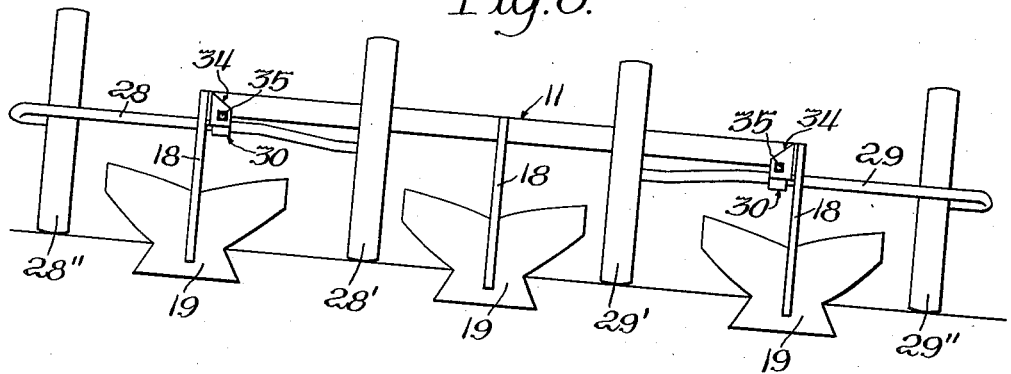
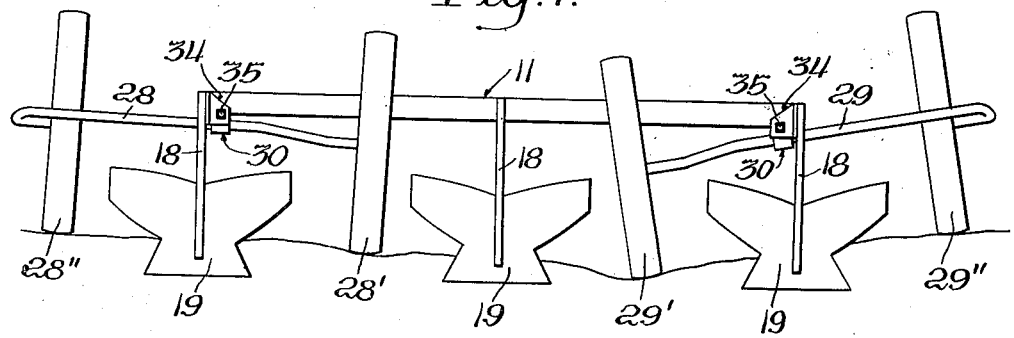
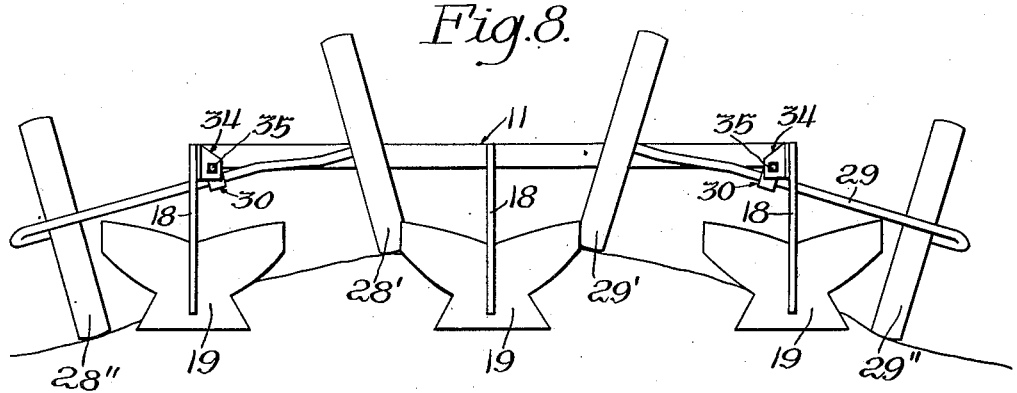

Patented Dec. 17, 1940

2,224,971

UNITED STATES PATENT OFFICE 2,224,971

GROUND WORKING IMPLEMENT

Alexus C. Lindgren and Arnold E. W. Johnson, Chicago, Ill., assignors to International Harvester Company, a corporation of New Jersey Application October 15, 1938, Serial No. 235,153

15 Claims. (Cl. 97—72)

This invention relates to ground-working implements of the type adapted to be trailed behind a tractor and having its own power lifting means for moving the ground-working tools to and from their ground-working position. More particularly, it relates to the attachment of the ground-supporting wheels to the tool-carrying frame.

It is an object of the present invention to provide an improved trail-behind type of ground-working implement.

It is another object of the invention to provide a novel attachment of the ground-supporting wheels to the tool-carrying frame, in which the wheels disposed transversely of the tool-carrying frame remain in contact with the ground at all times regardless of the contour of the same, the wheels adjusting themselves automatically to follow the contour of the ground, as a result of which uniformity of plowing depth will tend to be automatically maintained.

It is another object of the invention to provide a plurality of power lifting mechanisms adapted to be operated by the supporting wheels, all of which mechanisms are at locations remote from the point of pivot of the machine when it is being turned for its return trip across the field.

In general, the invention comprises a tool-carrying frame having working tools such as lister plows transversely spaced thereon, and a pair of double crank axles transversely spaced with respect to each other which are pivotally connected to the frame for free vertical tilting movement with respect thereto, these axles having the usual supporting wheels thereon. The portion of the axles having the wheels nearest the center line of the frame each have power lifting mechanisms associated therewith for the raising of each side of the frame with respect to the respective crank axles. The work to be done in raising the implement frame so that the tools are out of their ground working operation is thus divided between two power lifting mechanisms. By using double crank axles so pivoted to the frame and so disposed that all the wheels are transversely alined, all the wheels will remain in contact with the ground at all times. This is particularly important for the operation of power lifting mechanisms adapted to be operated by the supporting wheels. By the present invention, the keeping of the power lifting wheels on the ground regardless of the contour thereof is assured. Manual means for adjusting the working depth of the working tools is provided for at each side of the machine. The outer wheels of each double axle remain at all times in contact with the ground, hence it is assured that there is always an outer wheel on the ground ready to serve as a turning axis for the implement. The inner wheels having the power lift mechanism are thus always assured of travel upon turning the implement for return movement across the field.

For the objects and a better understanding of the invention, reference may be had to the following detailed description taken in connection with the accompanying drawings, in which:

Figure 1 shows a side elevational view of the implement embodying the present invention;

Figure 2 is a plan view of the machine, illustrating particularly the arrangement of the transversely spaced double crank axles;

Figure 3 is a rear view of a portion of the machine along the line 3—3 of Figure 2;

Figure 4 is a detailed cross-sectional view taken along the line 4—4 of Figure 2 of the portion of the pivotal connection of the crank axles with the frame;

Figure 5 is a sectional view of the pivotal connection taken along the line 5—5 of Figure 4; and, Figures 6, 7 and 8 are diagrammatic views illustrating the adaptability of the machine over different conditions of contours of the ground.

Referring now to Figures 1, 2 and 3, there is provided a frame comprising, in general, a transverse angle bar 11, rearwardly extending longitudinal members 12, 13 and 14, each of which have an up-set rear end portion adapted to receive one edge of a transversely extending tool bar 15, this rear end portion having ears 16 through which pass bolts 17 for the attachment of a stub beam 18 carrying a working tool or lister plow 19. With the tool bar held against the rear ends of the longitudinally extending members by the bolts for the attachment of the stub beams 18 thereto, and with the angle bar 11 connecting the forward ends of the members, there is provided, in general, the tool-carrying frame. Connected to the underneath face of the angle member 11, as at 21, are longitudinally extending members 22 and 23 extending rearwardly and connected to the center longitudinal member 13 and projected forwardly to a point in advance of the machine. The forward projecting portions converge and are spaced to receive between the forward ends thereof a draft bar 24 pivoted at its rear end to the transverse bar 11 and adapted to be adjustable relative to the ends of the members 22 and 23 to adjust the point of the draft of the machine. In order to provide a wide range of adjustment, the spaced forward ends of the members 22 and 23 have a downwardly extending portion 25 in which there are located holes 26 for receiving a bolt 27 extending through both portions 25 of the ends of the members 22 and 23, respectively, and through the draft beam 24. The longitudinal members 12 and 14 are arranged to be adjustable in and out to provide for different spacings of the working tools. This is accomplished by having adjusting holes 11' in the forward transverse member 11.

Connected to each of the longitudinally extending members 12 and 14 are double crank axles 28 and 29, respectively, each of which carry inner and outer supporting wheels 28' and 28'' and 29' and 29'', respectively. These crank axles are connected to the sides of the beams near the rear ends thereof and the crank portions extend forwardly so that the supporting wheels are lying substantially mid-way of the length of the tool-carrying frame. The double crank axles are transversely spaced with respect to themselves and with respect to the frame, so that all of the wheels are in transverse alinement.

A pivotal connection means 30 is provided for connecting each crank axle to the frame. Each crank axle, as shown in detail in Figures 4 and 5, has two collar portions 31 thereon, between which and surrounding the axle, is located an upwardly extending U-member 32 in the open end of which is a block 33 having a contour 33' adapted to seat over the top of the crank axle. Each of the beams 12 and 14 carry a bracket 34 having laterally projecting portions 34'. The U-member 32 and the block 33 is pivotally connected to the projected portions 34' by the bracket 34 by a pivot bolt 35.

In order to brace the outside portions of the crank axles, there is provided a laterally extending bracing means 36 bent back upon itself and connected at its forward end to the outside face of the longitudinally extending member, as at 37, which pivot is alined with the main pivot at the rear of the member where a bent-back portion 36' of the bracing means 36 is pivotally connected to the pivot bolt 35. The means 36 has a projected member 38 at its outer end for connection to the crank axle 29. It should thus be seen that by the use of these lateral bracing means 36, any tendency for the crank axles to pivot in a horizontal plane will be prevented.

Extending upwardly on the beam 13 are brackets 39 in which are pivotally mounted transversely extending rock-shafts 40 and 41, the outer ends of which are rotatably mounted in brackets 42 and 43 carried, respectively, on the beams 12 and 14. Also carried by the longitudinal member 13 are quadrants 44 and 45, one for each manual adjusting arm 46 and 47, respectively, the lower ends of which are respectively connected to the rock-shafts 40 and 41. To effect the adjustment of the frame with its working tools thereon for varying the working depth of the working tools, the shafts 40 and 41 have lifting arms 48 and 49, respectively. The outer ends of these arms 48 and 49 are connected respectively by means of links 48' and 49' to crank members 51 and 52 which form a part of power lifting mechanisms 53 and 54 associated with the inside wheels 28' and 29', respectively. With these crank arms 51 and 52 remaining rigid, the frame with the tools thereon will be moved with respect to the point of connections of the arms 48 and 49 therewith. The crank axles 29, being rotatable in the U-members 32, will permit movement of the frame relative to the crank axles. It will thus be seen that manual adjusting means is provided for varying the working depth of the working tools.

When it is desired to operate the power lifting mechanism 53 and 54 in order to bring the working tools clearly out of the ground for the purpose of transporting the same, a single rope 55, accessible to the operator of the tractor, may be pulled forwardly and in turn a rock-shaft 56 extending transversely along the transverse member 11 will be rocked, the same having upwardly extending arms 57 and 58, which have connected at their upper ends, the connecting links 59 and 61 adapted to pull respectively on levers 62 pivotally carried by the crank axle whereby the power lifting mechanisms are put into operation. These power lifting mechanisms are well known in the art, being of the conventional half-revolution clutch type, and detailed operation of their clutching members is not deemed to be necessary in connection with this description. The release of the member with which the levers engage starts the operation of the power lift mechanism and the same will stop automatically when the element with which the levers engage has revolved a half-revolution. The lifting of the frame by these power lift mechanisms is effected through the respective cranks 51 and 52 acting through their connections 48 and 49, respectively, with the tool-carrying frame. As they rotate a half-revolution, the frame will be lifted from or lowered to its ground-working position, the crank axles rotating in the U-shaped members 32.

While there has not been shown a planter mechanism associated with the present machine, it is well known in the art that such planter mechanisms are readily adaptable and used with this type of machine.

To assist each power lifting mechanism as well as the manual adjusting means in the lifting of the frame relative to the crank axles, there are provided assisting springs 64 adjustably connected at their forward ends to the lateral brace means 36 and at their rear ends to arms 66 and 67 rigid respectively with the crank axles 28 and 29.

Referring now to Figures 6, 7 and 8, there is shown diagrammatic forms of the arrangement for the purpose of illustrating the operation of the machine under different conditions of contour of the ground. In Figure 6, it will be seen that the machine readily adapts itself to sloping ground, the same as in any machine not incorporating pivotally connected double axles which are freely movable in transverse vertical planes.

In Figure 7, there is shown the position of the crank axles when encountering a depression in the ground centrally of the implement. It will be noted that the inner wheels will drop into the depression and that the outer wheels remain in contact with the higher ground. When these inner wheels so drop into the depression, the crank axles will pivot about the outer wheels which are on the higher ground and permit the pivot points in connection of the axles with the frame to be lowered, consequently lowering the frame and working the tools. The tools will thus be lowered and the middle tool, in particular, will tend to be kept in the ground.

Referring now to Figure 8, there is shown the reverse condition from that shown in Figure 7, wherein there is a raised portion of the ground centrally of the implement. The reverse movement of the inner wheels will be effected upon passing of the raised portion of the ground. The inner wheels will likewise pivot about their outer wheels but in an upward direction. Consequently, raising the frame will tend to raise the middle working tool out of the ground so that it will not cause an undue drag on the implement by plowing a too great a depth. It should now be apparent from the foregoing description, that there has now been provided an improved machine which is readily adaptable to all conditions of the ground and which will tend to maintain uniform depth of all of the transversely spaced working tools.

Inasmuch as these wheels are always in contact with the ground, the weight of the frame will be uniformly distributed at all times on all the wheels and this is particularly desirable when the wheels are to be used to operate power lift mechanisms. Hence by the present construction, a machine has been provided wherein the power lift mechanisms can be operated at any time regardless of the contour of the ground. By having two power lift mechanisms, each mechanism only has to effect lifting of half of the weight of the implement and thus the action of the power lift mechanisms are more effective. By keeping the power lift operated wheels always on the ground and having only half the load to be raised by a single power mechanism, it should be readily seen that there has been provided a highly improved and effective implement.

Since the outer wheels always remain in contact with the ground, short turning of the machine will always be about either of these wheels as a pivot. Thus, the wheels operating the power lift mechanisms being removed from the outer wheels and from the point of pivot of the implement will always be assured of movement during turning of the implement for effecting operation of the power lift mechanisms.

While there may be various modifications and changes in the specific construction of this machine, it will be understood that such modifications and changes can be made within the spirit and scope of the invention as defined in the appended claims.

What is claimed is:

1. In a ground-working implement, the combination of a frame, a ground-working tool carried on the frame, a pair of double axles, each of which being pivotally connected near its midpoint to the frame for free tilting movement in a transverse vertical plane and transversely alined with respect to the ground-working tool and with respect to themselves, and supporting wheels on the axles.

2. In a ground-working implement, the combination of a frame, ground-working tools transversely spaced on the frame, a pair of transversely spaced double crank axles, each of which being pivotally connected to the frame for free tilting movement in a transverse vertical plane with respect thereto and having supporting wheels thereon, and means associated with each axle for vertically adjusting the frame relative to the wheels.

3. In a ground-working implement, the combination of a frame, ground-working tools transversely spaced on the frame, a pair of transversely spaced double crank axles, each of which being pivotally connected to the frame for free tilting movement in a transverse vertical plane with respect thereto and having supporting wheels thereon, power lift mechanism adapted to be operated by one of the supporting wheels on each axle to move the frame to and from ground-working position, and manual means to adjust for working depth of the ground-working tools.

4. In a ground-working implement, the combination of a frame, ground-working tools carried by the frame, a pair of transversely spaced double axles pivotally connected to the frame, one on each side of the center line thereof, for free tilting movement transversely with respect thereto, supporting wheels for each axle, and power lift mechanism adapted to be operated by supporting wheels of each axle nearest to the center line of the frame.

5. In a ground-working implement, the combination of a frame, ground-working tools carried by the frame, a pair of transversely extending double axles, each of which being pivotally connected to the frame for free tilting movement in a transverse vertical plane, and means associated with each of the double axles and with the frame for bracing the axle against horizontal movement.

6. In a ground-working implement, a tool-carrying frame, ground-working tools carried by the frame, transversely extending double axles, pivotal connecting means for connecting each of the axles to the frame for free pivotal movement in a vertical plane, means for bracing the axles against horizontal movement but permitting vertical movement thereof comprising a member having two points of connection with the frame, one of which is associated with the pivotal connection means, and the other on the frame longitudinally removed from the first point of connection.

7. In a ground-working implement, a tool-carrying frame, ground-working tools carried by the frame, transversely extending double axles, and pivotal connection means for connecting the double axles to the frame for free vertical movement, comprising projections extending from the frame, a U-shaped means surrounding the axle to retain the same, means associated with the U-member and with the axle to prevent lateral displacement of the axle relative to the U-member, and means for pivotally connecting the U-member to the spaced projections.

8. In a ground-working implement, a tool-carrying frame, ground-working tools carried by the frame, transversely extending double axles, and pivotal connection means for connecting the double axles to the frame for free vertical movement in a transverse vertical plane, comprising means surrounding the axle to retain the same, means associated with the surrounding means and with the axle to prevent displacement between the same, and means for pivotally connecting the surrounding means to the frame.

9. In a ground-working implement, a tool-carrying frame, tools transversely alined on said frame and rigidly connected thereto, three or more transversely spaced means for supporting the frame, one interposed between adjacent tools and transversely alined therewith, and means for connecting the supporting means to the frame for free vertical movement so that all of the same will remain free to stay in contact with the ground at all times regardless of its contour.

10. In a ground-working implement, a tool-carrying frame, two transversely spaced supporting wheels positioned inside of the frame, an outer supporting wheel at each outer side of the frame and transversely spaced with respect to the inside supporting wheels, power lift means associated with each of the inside suporting wheels, and means for movably connecting all of the supporting wheels to the frame so that they remain in contact with the ground at all times, whereby the power lift means will be instantly effective upon being released for operation.

11. In a ground-working implement, the combination of a frame, two outer working tools and an inner working tool transversely spaced with respect to each other on the frame and each of which is rigidly secured thereto, four transversely spaced supporting wheels arranged so that each working tool is flanked at each side with a supporting wheel, and means for connecting the wheels in pairs to the frame at locations in longitudinal alinement respectively with the two outer working tools and for free vertical movement.

12. In a ground-working implement, the combination of a frame, ground-working tools transversely spaced on the frame, a pair of transversely spaced double crank axles, each of which being pivotally connected to the frame for free tilting movement and having supporting wheels thereon, and power lift mechanism adapted to be operated by one of the supporting wheels on each axle to move the frame and tools to and from their ground-working position.

13. In a ground-working implement, a tool-carrying frame, ground-working tools carried by said frame, a pair of transversely extending double crank axles, each of which including a transverse portion and two crank portions, supporting wheels on said crank portions, means for pivoting each axle along its transverse portion to the frame to have free pivotal movement in a transverse vertical plane, the crank portions being arranged to extend longitudinally, said pivoting means allowing rotative adjustment of the axle therein in a longitudinally extending plane, and means for rotatively adjusting the crank axles to effect vertical adjustment of the frame with respect to the wheels.

14. In a ground-working implement, the combination of a frame, ground-working tools carried by the frame and transversely spaced with relation to each other, a pair of transversely spaced double crank axles including an axle portion and two crank arms, each of which being pivotally connected near its mid-point to the frame for free tilting movement in a vertical transverse plane during operation of the implement, supporting wheels on the crank arms, said crank axles being also axially rotatable in their mid-point connections to the frame, and means for adjustably fixing their rotative position to vary the working depth of the ground-working tools.

15. In a lister, the combination of a frame, lister plows carried by the frame and transversely spaced with relation to each other, a pair of transversely spaced double crank axles including an axle portion and two crank arms pivotally connected to the frame for free tilting movement in a transverse vertical plane with respect thereto, supporting wheels on the crank arms, said crank axles being also axially rotatable in their mid-point connections to the frame, and means for adjustably fixing their rotative position to vary the working depth of the lister plows.

ALEXUS C. LINDGREN.
ARNOLD E. W. JOHNSON.